(12) United States Patent
Wells

(10) Patent No.: US 6,711,586 B1
(45) Date of Patent: Mar. 23, 2004

(54) METHODS AND SYSTEMS FOR PROVIDING INFORMATION BASED ON SIMILARITY

(76) Inventor: William Mitchell Wells, 355 E. 4th St., Apt. 2A, New York, NY (US) 10009

( * ) Notice: Subject to any disclaimer, the term of this patent is extended or adjusted under 35 U.S.C. 154(b) by 1 day.

(21) Appl. No.: 09/618,138

(22) Filed: Jul. 17, 2000

(51) Int. Cl.⁷ .............................. G06F 7/00; G06F 15/16
(52) U.S. Cl. ..................................... 707/104.1; 709/203
(58) Field of Search .............................. 707/104.1, 513, 707/515; 345/355–339, 744–853; 705/10–14, 26; 709/200–204

(56) References Cited

U.S. PATENT DOCUMENTS

| | | |
|---|---|---|
| 4,348,744 A | 9/1982 | White |
| 4,358,277 A | 11/1982 | Moyes et al. |
| 4,464,122 A | 8/1984 | Fuller et al. |
| 4,595,990 A | 6/1986 | Garwin et al. |
| 4,627,818 A | 12/1986 | Von Fellenberg |
| 4,650,426 A | 3/1987 | Brigance |
| 4,705,479 A | 11/1987 | Maron |
| 4,736,294 A | 4/1988 | Gill et al. |
| 4,759,717 A | 7/1988 | Larochelle et al. |

(List continued on next page.)

OTHER PUBLICATIONS

Boley et al., "A client–side Web agent for document categorization," *Internet Research: Electronic Networking Applications and Policy*, vol. 8, No. 5, (1998) pp. 387–399.

Broder et al., "Syntactic clustering of the Web," *Computer Networks and ISDN Systems 29*, (1997), pp. 1157–1166.

Fekete et al., Excentric Labeling: Dynamic Neighborhood Labeling for Data Visualization,*CHI 99 Conference Proceedings*, ACM Press, (1999), pp. 512–519.

Maarek et al., "Automatically organizing bookmarks per contents," *Computer Networks and ISDN Systems 28*, (1996) pp. 1321–1333.

Dieter Merkl, "Exploration of Text Collections with Hierarchical Feature Maps," *Proc, of 20tht Ann. Int'l ACM SIGIR Conf. on Res. and Dev. in Info. Retrieval*, (1997), pp. 186–195.

Okada et al., "A Method for Personalized Web Searching with Hierarchical Document Clustering," *Transactions of Information Processing Society of Japan*, vol. 39, No. 4, (1998), pp. 868–876.

Peter Pirolli, "Exploring Browser Design Trade–offs Using a Dynamical Model of Optimal Information Foraging," *CHI 98 Conference Proceedings*, ACM Press, (1998), pp. 33–40.

Schütze et al., "Projections for Efficient Document Clustering," Proc. of the 20th Ann. Int'l ACM SIGIR Conf. on Res. and Dev. in Info. Retrieval, (1997), pp. 74–81.

Shahabi et al., "Knowledge Discovery from Web–Page Navigation," *Proceedings Seventh International Workshop on Research Issues in Data Engineering*, Birmingham, England, (1997) pp. 20–29.

Swan et al., "Aspect Window, 3–D Visualizations, and Indirect Comparisons of Information Retrieval Systems," *Proc. of the 21st Ann. Int'l ACM SIGIR Conf, on Res. and Dev. in Info. Retrieval*, (1998), pp. 173–181.

(List continued on next page.)

Primary Examiner—Uyen Le
Assistant Examiner—Te Y Chen
(74) Attorney, Agent, or Firm—Pennie & Edmonds LLP

(57) ABSTRACT

The present invention is related to an information providing method and system. More particularly, the present invention provides a method of searching for information on the basis of a user's level of interest in at least one primary document transmitted from a server to a client computer accessible by the user. Therefore, the present system and method are operable without receive a specific search string from the user. Depending on a an interest level response received by the server, the system searches for documents either similar or dissimilar to the primary document. Subsequently, the found documents are transmitted to client computer.

26 Claims, 5 Drawing Sheets

U.S. PATENT DOCUMENTS

| | | |
|---|---|---|
| 4,820,167 A | 4/1989 | Nobles et al. |
| 4,835,683 A | 5/1989 | Phillips et al. |
| 4,877,408 A | 10/1989 | Hartsfield |
| 4,972,318 A | 11/1990 | Brown et al. |
| 4,992,940 A | 2/1991 | Dworkin |
| 5,001,630 A | 3/1991 | Wiltfong |
| 5,122,952 A | 6/1992 | Minkus |
| 5,262,761 A | 11/1993 | Scandura et al. |
| 5,263,167 A | 11/1993 | Conner, Jr. et al. |
| 5,428,778 A | 6/1995 | Brookes |
| 5,483,278 A | 1/1996 | Strubbe et al. |
| 5,515,488 A | 5/1996 | Hoppe et al. |
| 5,530,852 A | 6/1996 | Meske, Jr. et al. |
| 5,548,705 A | 8/1996 | Moran et al. |
| 5,564,043 A | 10/1996 | Siefert |
| 5,600,781 A | 2/1997 | Root et al. |
| 5,657,461 A | 8/1997 | Harkins et al. |
| 5,694,459 A | 12/1997 | Backaus et al. |
| 5,694,594 A | 12/1997 | Chang |
| 5,696,885 A | 12/1997 | Hekmatpour |
| 5,696,965 A | 12/1997 | Dedrick |
| 5,710,899 A | 1/1998 | Eick |
| 5,724,567 A | 3/1998 | Rose et al. |
| 5,734,863 A | 3/1998 | Kodosky et al. |
| 5,761,418 A | 6/1998 | Francis et al. |
| 5,774,128 A | 6/1998 | Golshani et al. |
| 5,790,121 A | 8/1998 | Sklar et al. |
| 5,808,609 A | 9/1998 | Guha |
| 5,832,494 A | 11/1998 | Egger et al. |
| 5,835,085 A | 11/1998 | Eick et al. |
| 5,848,407 A | 12/1998 | Ishikawa et al. |
| 5,864,343 A | 1/1999 | Naughton et al. |
| 5,864,845 A | 1/1999 | Voorhees et al. |
| 5,867,799 A * | 2/1999 | Lang et al. .................... 707/1 |
| 5,886,698 A | 3/1999 | Sciammarella et al. |
| 5,889,523 A | 3/1999 | Wilcox et al. |
| 5,890,152 A | 3/1999 | Rapaport et al. |
| 5,911,140 A | 6/1999 | Tukey et al. |
| 5,926,812 A | 7/1999 | Hilsenrath et al. |
| 5,933,818 A | 8/1999 | Kasravi et al. |
| 5,963,949 A | 10/1999 | Gupta et al. ................. 707/100 |
| 5,999,924 A | 12/1999 | Bair et al. ...................... 707/4 |
| 6,327,574 B1 * | 12/2001 | Kramer et al. ................. 705/14 |
| 6,404,445 B1 * | 6/2002 | Galea et al. ................. 345/853 |
| 6,480,194 B1 * | 11/2002 | Sang'udi et al. ............ 345/440 |

OTHER PUBLICATIONS

Wulfekuhler et al., "Finding salient featured for personal Web page categories," *Computer Networks and ISDN Systems 29*, (1997) pp. 1147–1156.

Zamir et al., "Web Document Clustering: A Feasibility Demonstration," Proc. of the 21st Ann. Int'l ACM SIGIR Conf. on Res. and Dev. in Info. Retrieval, (1998), pp. 46–54.

Zamir et al., "Grouper: a dynamic clustering interface to Web search results," *Computer Networks Proc. of the 8th Int'l World Wide Web Conf.*, vol. 31, (1999), pp. 1361–1373.

Abstract: Zamir et al., "Fast and intuitive clustering of Web documents," Proc. pf the 3$^{rd}$ Int'l Conf. on Knowl. Disc. and Data Mining—KDD 97 Newport Beach, CA, (1997), pp. 287–290.

Abstract: "BiblioMapper: a cluster–based information visualization technique," *Proc. IEEE Symposium on Info. Visual. Res. Triangle, CA*, (1998), pp. 130–136.

Abstract: Shimamura et al., "A domain cluster interface for WWW search," *Proc. 3rd Asia Pacific Computer Human Interaction (Cat. No. 98EX110)*, (1998), pp. 318–323.

* cited by examiner

METHODS AND SYSTEMS FOR PROVIDING INFORMATION BASED ON SIMILARITY

FIELD OF THE INVENTION

The present invention is related to a client-server based information providing system. In particular, the present invention provides a method of searching for information on the basis of a level of similarity of the information to a primary document.

BACKGROUND OF THE INVENTION

Finding documents of interest on a server whether connected to the Internet or not has become extremely challenging because of the abundance and diversity of the available documents. Traditionally, two approaches have been available to users seeking documents of interest: index-like search engines and search engines.

Indexes transmit information to a client computer in the form of a Web page comprising document categories such as arts, sports, finance, etc. When a user selects a category, such as by clicking on a button corresponding to the category, one or more subcategories are transmitted to the client computer in a second Web page. Thus, for example, if a user selects "finance", subcategories comprising equities, interest rates, and corporate summaries might be transmitted with the second Web page.

Index-like search engines, however, often fail to provide a user with a document of interest. For example, indexes require the construction of a structured database comprising a plurality of documents that are categorized with respect to the information therein. The need for operators to enter the documents into the database disadvantageously limits the size of the database and accordingly, the number of documents that can be found using the index-like search engine. Therefore, a document sought by a user may not be contained in the index-like search engine.

Search engines, on the other hand, typically do not utilize structured databases to provide information to users having a query. Instead, a user must provide a search expression comprising one or more search terms, such as a key word that the user perceives as relevant to his/her query. Subsequently, a database comprising a plurality of documents is searched for matching documents that partially or completely match the search expression received from the user. Links to one or more of the matching documents is then transmitted to a client computer in the form of a Web page hypertext buttons. A user may select or click on one of the links to either go to the selected document or obtain additional information from the server about the document.

For a number of reasons, however, traditional search engines often fail to retrieve a document that comprises information that satisfies a user's query. For example, because traditional search engines require the receipt of at least one specific search term from the user, a user who is unfamiliar with such a search engine may be unable to provide a response to the search engine's request for a search expression either because they do not know how or become intimidated. Even if a search expression is received from such a user, the search expression may comprise nonspecific or extraneous terms that prevent the search engine from retrieving a selection of pertinent documents. Experienced users also may have difficulty utilizing a traditional search engine. For example, users often have only an intuitive idea of the search terms that actually characterize the sought after document and are, therefore, unable to provide the specific search terms needed to pose a successful query to the search engine.

What is needed, therefore, is a method of providing information to a user who is unable to supply specific search terms characterizing the information he/she seeks.

SUMMARY OF THE INVENTION

The present invention relates to a method for searching and providing information to a user. The method includes the steps of transmitting a primary selection to the user, receiving a level of interest in the primary selection from the user and obtaining a set of associated selections having a level of similarity to the primary selection determined on the basis of the level of interest, and transmitting at least a subset of the associated selections to the user.

Preferably, the obtaining step comprises searching a database to obtain the set of associated information selections. The level of similarity is preferably determined to have one of at least three different levels and a different set of associated selections is obtained depending on which level is determined.

Typically, the primary selection and at least some members, for example, each member, of the set of associated selections are characterized by a plurality of attributes and the level of similarity is determined from the absolute or relative number of attributes common to a member of the set of associated selections and the primary selection. The attributes preferably comprise at least one of text related to the associated selections or primary selection and a graphic related to the associated selections or primary selection. For example, the attributes may comprise at least one of a word, a phrase, and a keyword.

In a preferred embodiment, the primary selection relates to a primary item and each member of the set of associated selections relates to a different associated item. For example, the primary item and the associated items preferably relate to at least one of a document comprising information, an object for sale, an object for rent, and a service. The document preferably comprises at least one of HTML (hypertext markup language, DHTML (dynamic hypertext markup language), x-text, or x-HTML (extensible markup language). The object for sale preferably comprises at least one of computer software, a compact disc, a video, a book, an article of food, an automobile, a source of audio provided over the Internet, a source of video provided over the Internet, and an article of clothing. The object for rent preferably comprises at least one of a compact disc, a video, a book, or an automobile.

In a preferred embodiment, the method further comprises receiving a new primary selection from the user and replacing the primary selection with the new primary selection. The new primary selection is preferably a subset of the set of associated selections. The method may further comprise optionally receiving a new level of interest from the user and replacing the level of interest with the new level of interest, searching a database to obtain a new set of associated selections having a level of similarity to the new primary selection determined on the basis of the level of interest and transmitting the new set of associated selections to the user. The optional receiving, searching, and transmitting the subset steps are repeated in a preferred embodiment.

The present invention also relates to a computer system for delivering information to a client computer, comprising a server configured to transmit a primary selection to the user, receive a level of interest in the primary selection from the user, obtain a set of associated selections having a level of similarity to the primary determined on the basis of the level of interest, and transmit at least some of the associated selections to the user.

The system is preferably configured to search a database to obtain the set of associated information selections. In a preferred embodiment, the server computer is configured to partition the level of similarity into one of at least three different levels and obtain a different set of associated selections depending on which level is determined. The primary selection and each member of the set of associated selections are preferably characterized by a plurality of attributes and the level of similarity is determined from the absolute or relative number of attributes common to a member of the set of associated selections and the primary selection. The attributes preferably comprise at least one of text related to the associated selections or primary selection and a graphic related to the associated selections or primary selection. For example, the attributes may comprise at least one of a word, a phrase, and a keyword.

In a preferred embodiment, the primary selection relates to a primary item and each member of the set of associated selections relates to a different associated item. For example, the primary item and the associated items relate to at least one of a document comprising information, an object for sale, an object for rent, and a service. The document preferably comprises at least one of HTML (hypertext markup language, DHTML (dynamic hypertext markup language), x-text, or x-HTML (Extensible Markup Language). The object for sale preferably comprises at least one of computer software, a compact disc, a video, a book, an article of food, an automobile, a source of audio provided over the Internet, a source of video provided over the Internet, and an article of clothing. The object for rent comprises at least one of a compact disc, a video, a book, or an automobile.

In another preferred embodiment, the system further comprises software to receive a new primary selection from the user and replace the primary selection with the new primary selection. Preferably, the new primary selection is a subset of the set of associated selections. The server is preferably configured to, optionally receive a new level of interest from the user and replace the level of interest with the new level of interest, search a database to obtain a new set of associated selections having a level of similarity to the new primary selection determined on the basis of the level of interest, and transmit the new set of associated information selections to the user.

DETAILED DESCRIPTION OF THE INVENTION

Figure 1:
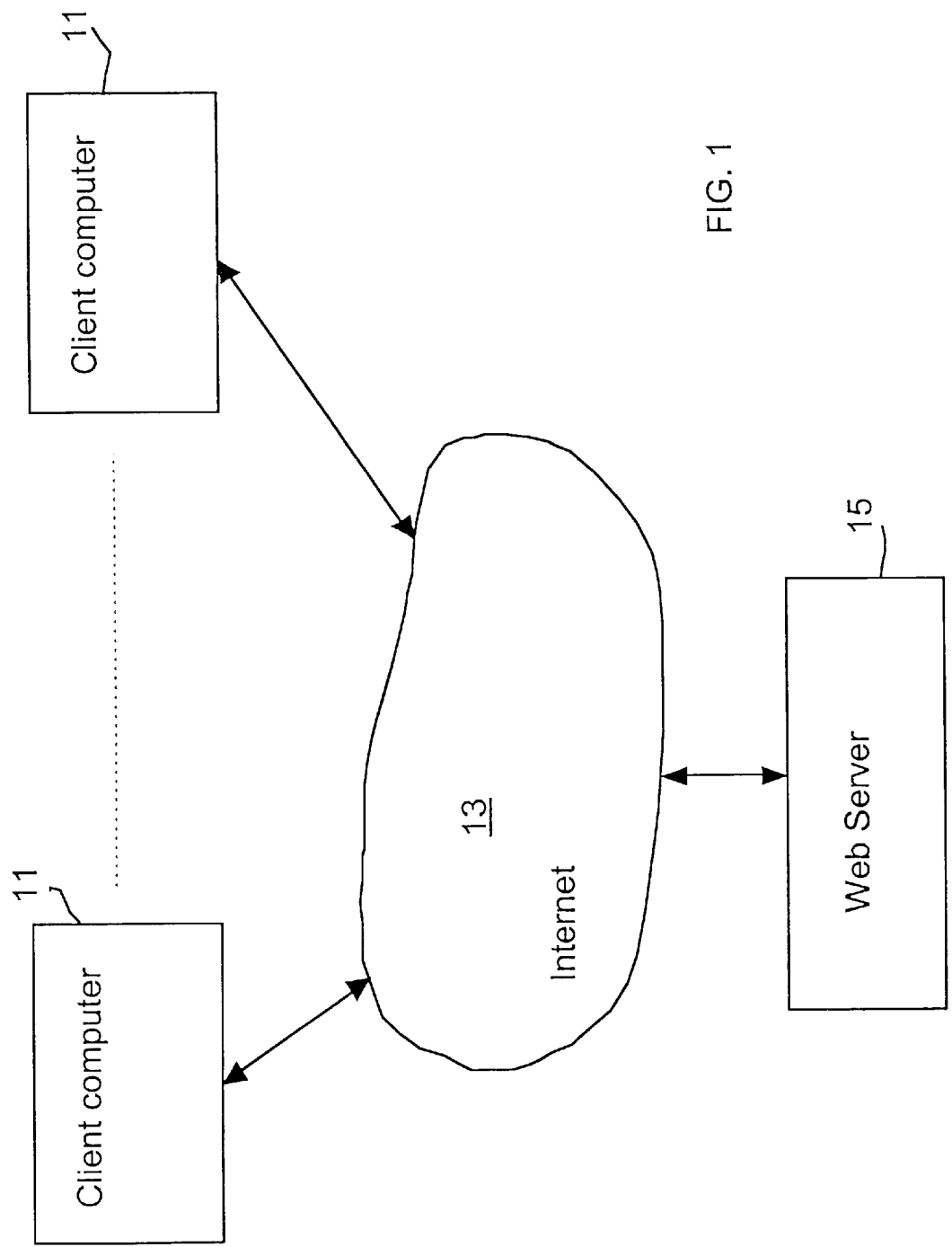
FIG. 1 is a block diagram of various components of the present invention.

Referring to FIG. 1, the present invention operates in a client-server environment, which preferably includes a number of client computers 11 connected to a Web server 15, configured to transmit information to client computer 11, via the Internet 13. In an alternative embodiment, client computers 11 are connected to Web server 15 via local area network (LAN) or wide area network (WAN) which may also be connected to the Internet 13. Various other ways to connect client computers 11 to Web server 15 are also available in the art. The following discussion is mostly directed to one client computer 11 and one user thereof. It should be noted that same descriptions of the client computer and its features are to be duplicated in other client computers 11 and to numerous users thereof.

Client computer 11 is preferably a personal computer (PC), which can be operated by one or more users privately in their respective homes. In an alternative embodiment, public client computers are available in locations offering goods or services such as retail stores or rental facilities. In alternative embodiments, client computer 11 is a Unix workstation. In yet another embodiment, client computer 11 is not required to include a microprocessor, as long as client computer 11 is capable of sending and receiving Web browser messages over the Internet with Web server 15. Client computer 11 may be operated using Windows®, Linux, Unix, a Web based operating system or other operating systems available in the art. The specific type of processor and operating system used by client computer 11 is not important to the present invention.

As noted above, client computer 11 is preferably linked to Web server 15 via the Internet. More specifically, client computer 11 and Web server 15 are connected through an Internet Service Providers (ISP). Client computer 11 and Web server 15 preferably communicate with each other using a common communication protocol, such as Hypertext Markup Language (HTML), Java, JavaScript, Extended Markup Language (XML) or other similar communication protocol available in the art.

Client computer 11 preferably comprises an input device such as a keyboard and mouse to allow the client computer to collect information from the user. More specifically, one or more Web pages are downloaded from Web server 15 to client computer 11 and displayed on a monitor associated with client computer 11. The Web pages present the user with a number of selections to allow the user to search interactively for information, e.g., in the form of one or more documents, even when the user does not know specific attributes, such as a word or keyword, that characterize the information. Preferably, the Web pages comprise a graphical user interface (GUI) such that the user can select items on the page such as by clicking with a pointer actuated by the mouse.

Web server 15 preferably includes a communication interface, one or more processors (e.g., one or more microprocessors), random access memory (RAM), read only memory (ROM), a database interface and other conventional components of an Internet Web server as known in the art. The communication interface is preferably configured to transmit and receive electronic messages from remote locations, i.e., client computers 11, via the Internet 13 using a common communication protocol such as TCP/IP and/or a common Web browser. In particular, the communication interface receives responses collected by client computer 11 as discussed below.

The ROM preferably stores a number of software applications which are to be downloaded to the processor and executed therein. The software applications include operating systems, device drivers and other software applications as known in the art. Moreover, the software applications further include computer executable instructions necessary to run various search methods, Web page generation and storage and other software applications necessary to provide numerous features of the present invention as discussed herein.

Via the database interface Web server 15 is coupled to at least one database comprising a plurality of documents. Each of the documents preferably relates to an item that may be of interest to a user. For example, the items may correspond to an object for sale or rent such as a compact disc, video, book, software, automobile, or the like. Alternatively, the items may correspond to documents such as HTML, DHTML, or x-HTML (extensible markup language) documents that may contain information of interest. The database is preferably implemented using conventional database management systems such as ORACLE®, SYBASE® or other similar products. The database interface is configured to generate appropriate search commands to retrieve relevant documents from databases based on commands from the processor. In an alternative embodiment, the processor may interface directly with the databases.

Using the client-server system described above, the present invention provides a method and system for searching for and providing information to a user without receiving a traditional search expression from the user. Therefore, the present invention is not limited to retrieving documents that either contain or do not contain a particular search term or expression provided by the user. Instead, the present invention allows the search to proceed intuitively or arbitrarily on the basis of the user's level of interest in a primary selection of information transmitted to the user. For example, if the user expresses interest in the primary information, the present invention retrieves information similar to the primary information and transmits it to user. When the interest level expressed by the user increases, the similarity of the retrieved information to the primary information is increased. On the other hand, if the user expresses a low level of interest in the primary information, the present invention retrieves information that is dissimilar to the primary information. By returning information that is similar to an interesting item or dissimilar to an uninteresting item, the present invention allows a user to proceed intuitively or arbitrarily. Therefore, the present invention provides the user with information that he/she would not have been able to obtain using traditional information retrieval methods.

In the following discussion, the present invention is clarified via an exemplary example of a system and method for transmitting information related to movies to a client computer. This embodiment of the present invention is suitable for use at, for example, a location or Web site for rental or purchase of movies. It should be noted, however, that the present invention is not limited to movie related information and is adaptable to searching for and providing all types of information to a user.

Figure 2A:
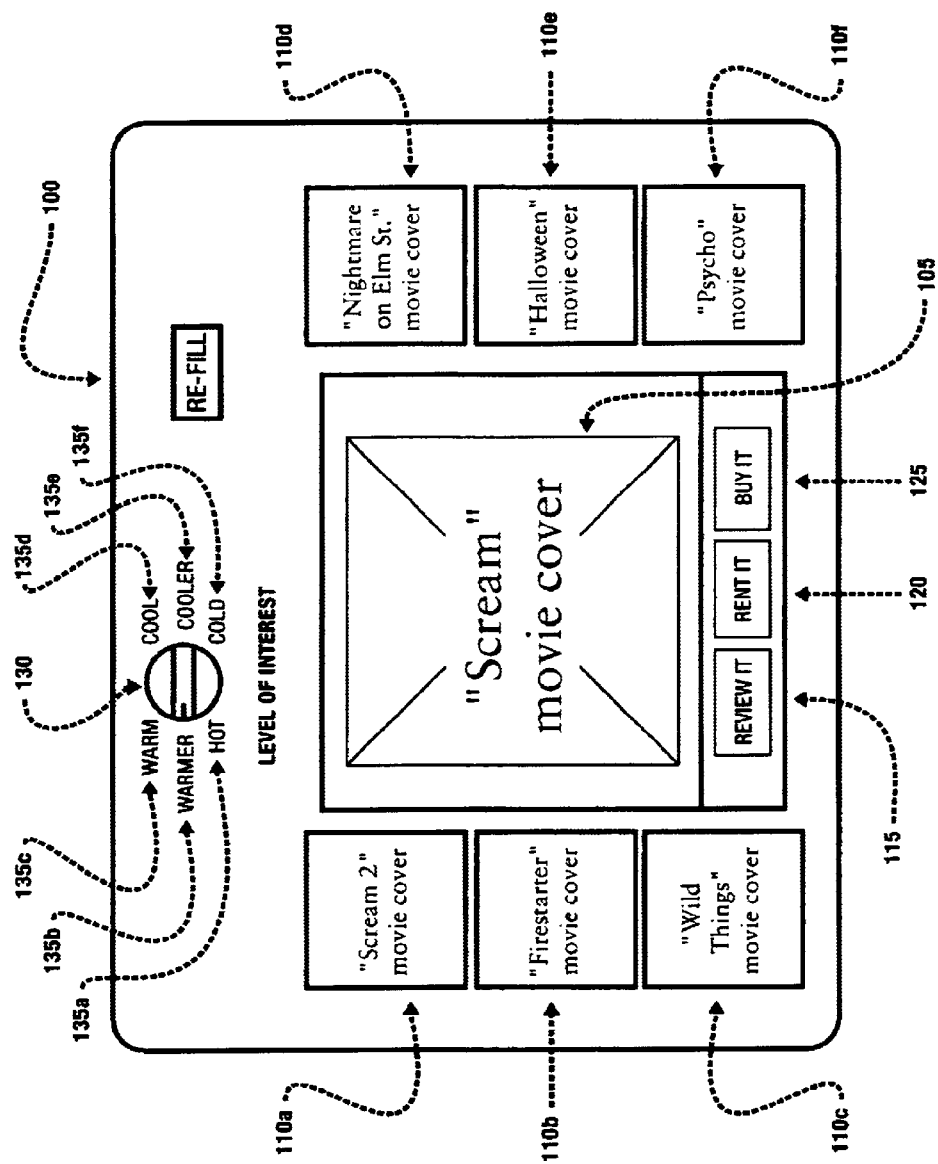
FIG. 2a is a diagram of an interface of a preferred embodiment of the present invention.

FIG. 2a shows an example of a first Web page 100 arranged and formatted by Web server 15 and transmitted to client computer 11 accessible to a user who is seeking information. First Web page 100 is configured to provide the user with information that relates to an item, such as an object, document, or service, that may be of interest to the user. The information is preferably provided as one or more selectable buttons on first Web page 100. By selectable button, we mean an element of a graphical user interface (GUI) that a user can select with, for example, keyboard commands or a mouse driven pointer. Upon selecting a button, the user can manipulate the button such that responses to guide the search for and transmission of information are received by the client server, as discussed below.

Therefore, first Web page 100 includes a first primary information selection 105, which, in this example, provides information related to the movie SCREAM. Web page 100 also includes a plurality of first associated information selections 110*a*–110*f*, which provide information relating to other, different movies. The term selections is used to indicate that the information is represented on Web page 100 by a selectable button as described above. Additionally, unless it is specified otherwise, the term selections is meant to comprise both the primary selection and associated selections of a Web page of the present invention. As can be seen in FIG. 2a, the selections display information related to the selection to allow a user to determine a level of interest in the item associated with the selection. Therefore, in the present example, the selection includes the title, director, actors, or a graphic related to the associated movies.

In addition to the information displayed with each selection, the first Web page includes a selectable button 115 configured to provide further information, such as a review of the one of the selections, to client computer 11 to further assist the user in determining whether a selection is of interest. For example, a user would first click on one of the selections about which he/she desires further information and then click on button 115 such that a response for further information is received by the server. Subsequently, the further information is transmitted to client computer 11 for the user's review.

In certain cases, one of the initially provided selections may be of particular interest to the user. Such a selection, i.e., one that satisfies a query of the user, is defined as a terminal selection. In general, the Web page is configured to provide the user with further options once a terminal selection has been found. For example, the Web page includes a selectable rental button 120 and a selectable purchase button 125 configured to allow the user to request information regarding, for example, the sale or rental of an item relating to a terminal selection. As before, when a user clicks on rental button 120 or purchase button 125, a request is received by the server to transmit information to client computer 11 related to this request. Thus, the present invention provides a method for the user to purchase or rent any of the selections such as, for example, the movie HALLOWEEN 110*e*.

Often, however, the first Web page transmitted to a user as part of the present invention does not include a terminal selection. Therefore, Web page 100 is configured to query the user's level of interest in primary selection 105 to guide a search of a database to obtain selections that are more similar or less similar to primary selection 105. For example, Web page 100 also includes a level of interest selector 130 having a plurality of selectable interest level buttons 135*a*–*f* configured to receive a response from the user relating to the user's level of interest in primary information selection 105. In this example, level buttons 135*a*–*f* correspond to a level of interest that ranges from cold 135*f*, i.e., relating to a minimal level of interest, to hot 135*a*, i.e., relating to a highest level of interest. Upon viewing primary information selection 135, the user can select a particular button that corresponds to his/her perceived level of interest in the primary information selection. When a user selects an interest level button 135*a*–*f*, such as by clicking on it with a mouse, a corresponding response is received by Web server 15.

Once a level of interest has been received from the user, a quantified level of similarity criterion is determined from the level of interest. The level of similarity can be defined between any two selections and relates to the number of attributes or characteristics that are common to the two selections. For example, the genre, director, stars, year in which it was released, producer, title, and the like of a movie comprises attributes of the movie. Therefore, the associated information selections and primary information selection 105 have a level of similarity because the movies that they relate to are all from the same genre, e.g., horror. As discussed below, the present invention utilizes attributes, such as keywords or text relating to primary information selection 135, to codify the level of similarity, whereas the user can determine a level of interest in an information selection based upon purely arbitrary or undefined perceptions.

Initially, the level of interest selector 130 and the level of similarity determined therefrom are set to default values when the first page is transmitted to client computer 11. Thus, the first set of associated information selections have a level of similarity to the primary selection that corresponds to the default level of similarity. For example, FIG. 2a shows that level of interest button 135b corresponding to "warmer" is the default setting. In this example, the term warmer corresponds to a level of interest only one setting higher than the highest level of interest, i.e., hot. As described above, when the user expresses a given level of interest in primary selection 105, documents, i.e., associated selections, are retrieved that have a level of similarity to the primary selection 105 determined on the basis of the level of interest. The method for determining the level of similarity is discussed more completely below. It can be seen, however, that the movies related to associated selections 110a–f are generally horror movies that also share at least one other attribute, such as the same director, producer, or actor, with primary selection 105.

Figure 2B:
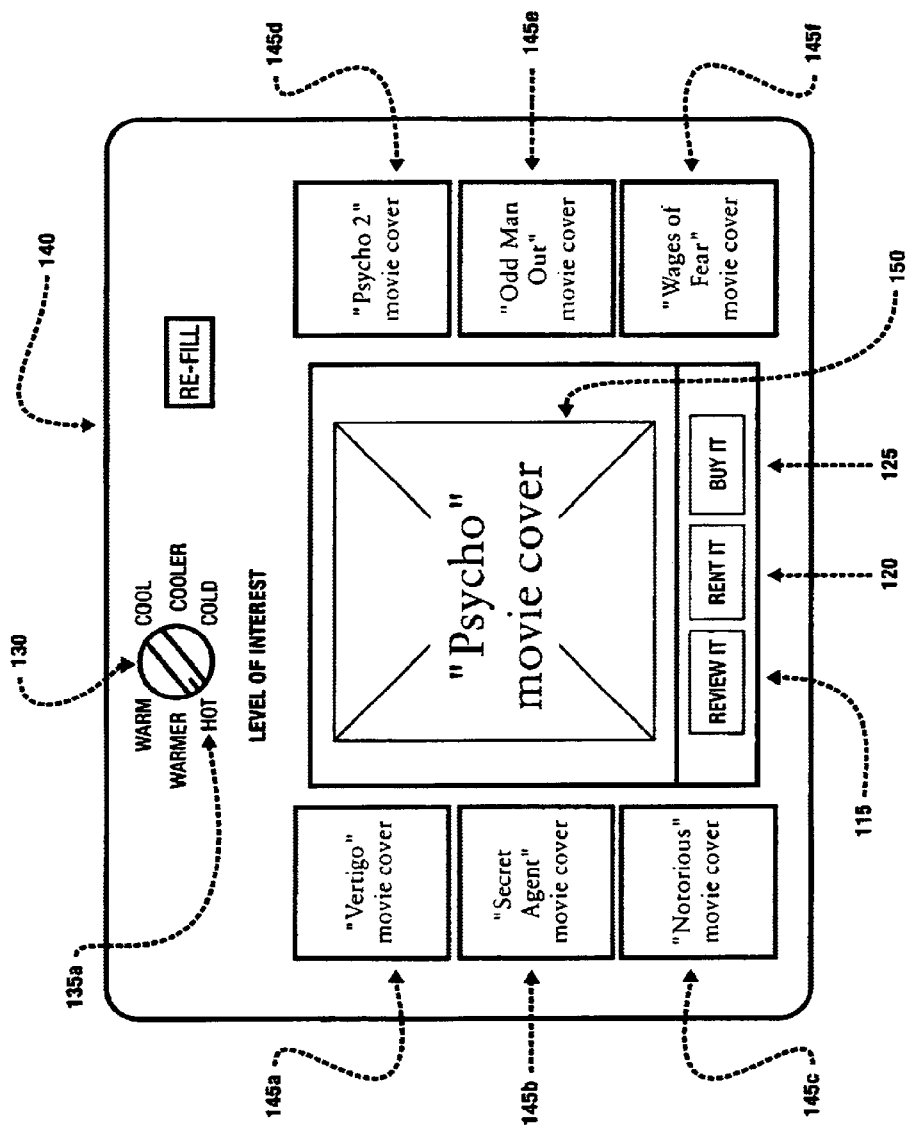
FIG. 2b is a diagram of another interface of a preferred embodiment of present invention.

Upon viewing first Web page 100, the user may determine that none of the selections comprise a terminal selection but one of associated selections 110a–f has a higher level of interest than primary selection 105. Therefore, the Web page is configured to receive a response from the user to replace first primary information selection 105 with the more interesting associated information selection. This response might be received by the Web server 15 if, for example, the user double clicks on one of associated selections 110a–f. FIG. 2b shows a second Web page 140 transmitted after the first primary information selection 105 has been updated to replace SCREAM with associated information selection 110f relating to the movie PSYCHO. Because new primary selection 150 is of greater interest to the user than first primary selection 135, second Web page 140 is also configured, as discussed above, to obtain a response from the user to update the level of interest. Accordingly, FIG. 2b shows that the button 135a corresponding to the highest level of interest, i.e., "hot" has also been selected.

Once the new primary selection 150 and level of interest have been received by the server, a new level of similarity is determined on the basis of the new level of interest. Subsequently, a database is searched for a new set of associated selections corresponding to the updated primary selection and the new set of associated selections are transmitted to client computer 11. The database comprises a plurality of documents relating to movies that can be searched on the basis of attributes and transmitted in the form of selections to client computer 11. Although the database may be structured in the sense that the documents be searched on the basis of keywords or categories associated with the documents, this is not essential to the present invention. Therefore, FIG. 2b shows that the set of first associated information selections has been replaced with an updated set of associated information selections 145a–f that are generally more similar to the updated primary selection 150 than the first associated selections 110a–f are to the first primary information selection 105. For example, the updated associated selections 145a–f and primary selection 150 all comprise black and white horror movies from the 1950's. Thus, in response to an increased level of interest selected by the user, the present invention has searched for and transmitted to the user a more narrowly defined set of associated selections. Subsequently, the user can proceed by selecting one of the associated selections to obtain further information or the user may proceed with the search to obtain an updated choice of associated selections. Therefore, the present hypothetical example illustrates the present system and method for searching and providing information to a user without receiving specific search terms from the user.

The following discussion describes specific features of the present invention. The selections transmitted to client computer 11 relate to any items that may be of interest to the user. For example, the items may correspond to an object for sale or rent such as a compact disc, video, book, automobile, or the like. Alternatively, the items may correspond to documents such as HTML (hypertext markup language, DHTML (dynamic hypertext markup language), x-text, or x-HTML documents that contain information of interest to a user. Thus, the selections may comprise links to documents found on the server or Internet. The selections may also comprise links that provide information regarding services of interest to the user. For example, the selections may comprise links related to eating establishments, physicians, home maintenance, or other services. Thus, as shown in FIGS. 2a and 2b, the selections provide information such as keywords, text, or graphics about the object, document, or service corresponding to the selection.

Each of the selections is characterized by a plurality of attributes, which relates to the content of or information associated with the selection and its corresponding item. For example, words or phrases appearing in the text of a selection can be used as attributes to characterize the selection. Examples of words or phrases that might appear in the text of a selection include the name of an actor in a movie related to a selection or a style of food at a restaurant related to a selection. Other information, such as keywords, which need not necessarily appear in the selection, also provide useful attributes to describe the selection. For instance, a Web site related to cycling might be characterized by a keyword such as "sports," which may not appear in the cycling related Web site. Nonetheless, the keyword "sports" is useful to describe the content of the cycling Web site. Thus, as defined herein, an attribute refers to any information that can be used to catagorize and/or characterize selections or the items they correspond to such one selection can be distinguished from another having one or more different attributes. Generally, the number of attributes differs from one selection to another at least because each selection may contain a different amount of text.

If two selections share an attribute, that attribute is defined as being common to the selections. For example, a keyword or word found in the text of each of two selections is common to the two selections. Thus, the keyword correspond to the genre horror is common to all of the associated selections in FIG. 2a. In addition to common attributes, any one selection belonging to a pair of selections will typically have at least one attribute that is not shared by the remaining selection. Therefore, a level of association, i.e., a level of similarity, between any two selections can be defined using the number of attributes common to the two selections.

In general, the level of association between any two selections can range from none to complete. For example, a pair of selections that share no common attributes are characterized as having a level of association of none, i.e., the selections are very dissimilar. On the other hand, a pair of selections that share each and every attribute are characterized as having a complete level of association, i.e., the selections are very similar. Typically, however, the level of association between a first selection and a second selection will fall between none and complete because the first selection will have both common and uncommon (unshared) attributes with respect to the second selection. Moreover, the level of association between the first selection and two other selections will likely be different. Therefore, given a first selection and a plurality of other selections, the plurality of selections can be grouped into subsets each having a similar level of association for the first selection.

The level of association may be codified on the basis of a relative number of attributes of a first selection that are common to a second selection. Therefore, the full range of the level of association, i.e., from none to complete, can be partitioned into two or more sub-ranges that can be used to group selections having a corresponding number of common attributes to a primary selection. Table 1 shows an example in which the full range of the level of association is partitioned into six sub-ranges each corresponding to a different percentage of common attributes.

TABLE 1

| Sub-Range | Percentage of Common Attributes | Level of Association |
|---|---|---|
| 1 | 0 to 20 | Very low |
| 2 | 20 to 35 | low |
| 3 | 35 to 50 | moderate |
| 4 | 50 to 65 | moderately high |
| 5 | 65 to 80 | high |
| 6 | 80 to 100 | very high |

For example, consider the task of describing the level of association between a first selection characterized by a first set of attributes and a second selection characterized by a second set of attributes. Initially, the first set of attributes is compared to the second set of attributes to determine the number of first attributes common to the second selection. Once the number of first common attributes is known, the percentage of common attributes can be calculated using the total number of attributes in the first set. For example, referring to Table 1, if the first set of attributes comprises 100 attributes of which 32 are common to the second set of attributes then the 32% of the first attributes are common and the level of association between the first selection and the second selection can be characterized as low.

Table 2 shows an another example in which the level of association is partitioned into three sub-ranges. Each of the three sub-ranges comprises selections that have a corresponding percentage of common attributes to a particular primary selection.

TABLE 2

| Sub-Range Designation | Percentage of Common Attributes | Level of Association |
|---|---|---|
| 1 | 0 to 34 | low |
| 2 | 34 to 67 | moderate |
| 3 | 67 to 100 | high |

It should be understood, however, that the suitable number of sub-ranges and the size of each sub-range may be determined according to a number of variables including, but not limited to, the size and nature of the parent database and the number of attributes characterizing the selections in the database. However, at least two and preferably at least three sub-ranges are defined.

It is also possible to determine the level of association between selections by weighting each attribute with respect to its perceived importance in describing the content of or information associated with the selection. For example, a keyword may be perceived as more important than words found in the text. Therefore, the attributes that comprise common keywords would be given relatively more weight in determining the level of association between two selections.

If the level of association is instead determined on the basis of the percentage of the second set of attributes which are common to the first set of attributes, the level of association may be somewhat different because the first and second sets of attributes may comprise different numbers of attributes. Typically, however, the first and second sets of attributes comprise similar numbers of attributes such that the percentage of common first attributes will be similar to the percentage of common second attributes. Therefore, such differences in the association levels are preferably smaller than the size of each sub-range. In situations where the first and second sets of attributes comprise substantially different numbers of attributes, an average percentage of common attributes can be calculated by averaging the two levels of association between a first and second selection.

In addition to providing a substantially partitioned set of sub-ranges, as described above, a more continuous model may be used to define the level of association between selections. For example, a client computer may provide its user with an association selector ranging from a minimum to a maximum association in an essentially continuous fashion, for example, from none to complete.

Instead of requiring specific attributes relating to a user's query to perform a search, the present invention receives a level of interest response from the user a more qualitative estimate from the user of how similar or dissimilar he/she perceives the primary selection is from a satisfying terminal selection. Thus, the first Web page is also configured to provide the user with at least some information relating to each of the selections, such as one or more keywords, graphics, or words characteristic of the selections. The information provided should be sufficient to allow the user to determine a qualitative assessment of whether or not an selection that would satisfy the user's query is likely to be similar to or dissimilar to either the first primary selection or one of the first associated selections. Such an assessment is defined herein as a level of interest selection. Thus, the first Web page comprises a level of interest selector 120 including one or more level of interest selections 130 configured to obtain such a response from the user. The level of interest selection is received by the server and used to determine a level of association determined on the basis of attributes. For example, Table 3 shows an embodiment of the correspondence between the level of interest received from a user and the level of association determined therefrom.

TABLE 3

| Level of Interest | Level of Association |
|---|---|
| cold | Very low |
| cooler | low |
| cool | moderate |
| warm | moderately high |

TABLE 3-continued

| Level of Interest | Level of Association |
|---|---|
| warmer | high |
| hot | very high |

It should be stressed, however, that like the number of sub-ranges used to partition the full range of the level of association, the optimal correspondence between the level of interest and the level of association should be determined according to a number of variables including, but not limited to, the size and nature of the parent database and the number of attributes characterizing the selections in the database. Additionally, any label or indicia can be used to replace the labels, e.g., warm or hot, relating to a user's level of interest. Moreover, the user is not required to determine a level of association on the basis of attributes, as described herein. Instead, as described above, the user may proceed on a purely arbitrary or intuitive basis.

Figure 3:
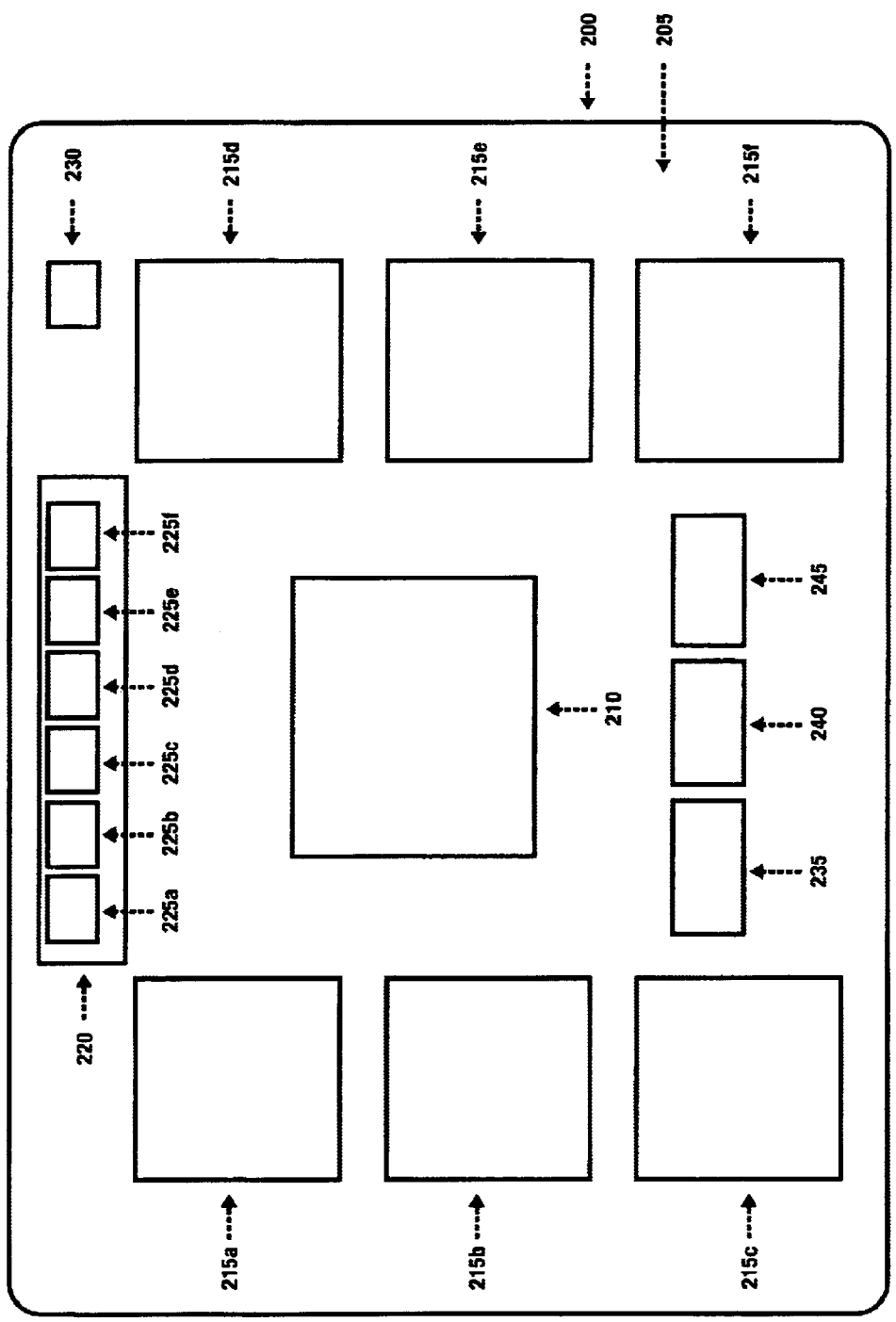
FIG. 3 is a diagram of a general interface of the present invention.

FIG. 3 shows an abstract form of a typical user interface 200 of the present invention. Interface 200 is preferably transmitted to a client computer 11 in the form of a Web page 205 comprising a graphical user interface comprising selectable buttons as described below. User interface includes a primary information selection 210, at least one associated information selection 215a–f, and a level of interest selector 220. Level of interest selector comprises selectable interest level buttons 225a–f. Web page also comprises a refresh button 230, which is selected when the user wishes to replace the set of associated selections 215a–f, as described below. Web page 205 also includes a review button 235, which is selected by a user when additional information relating to a particular primary or associate selection is desired. Subsequent to a user's selection of review button 235, a response is received by the server to transmit the information, which may comprise, for example, a review or a portion of a document related to the selection, to client computer 11. Web page 205 also includes a rental button 240 and a purchase button 245, which can be selected when the user wishes to rent or purchase an item relating to the primary selection.

Figure 4:
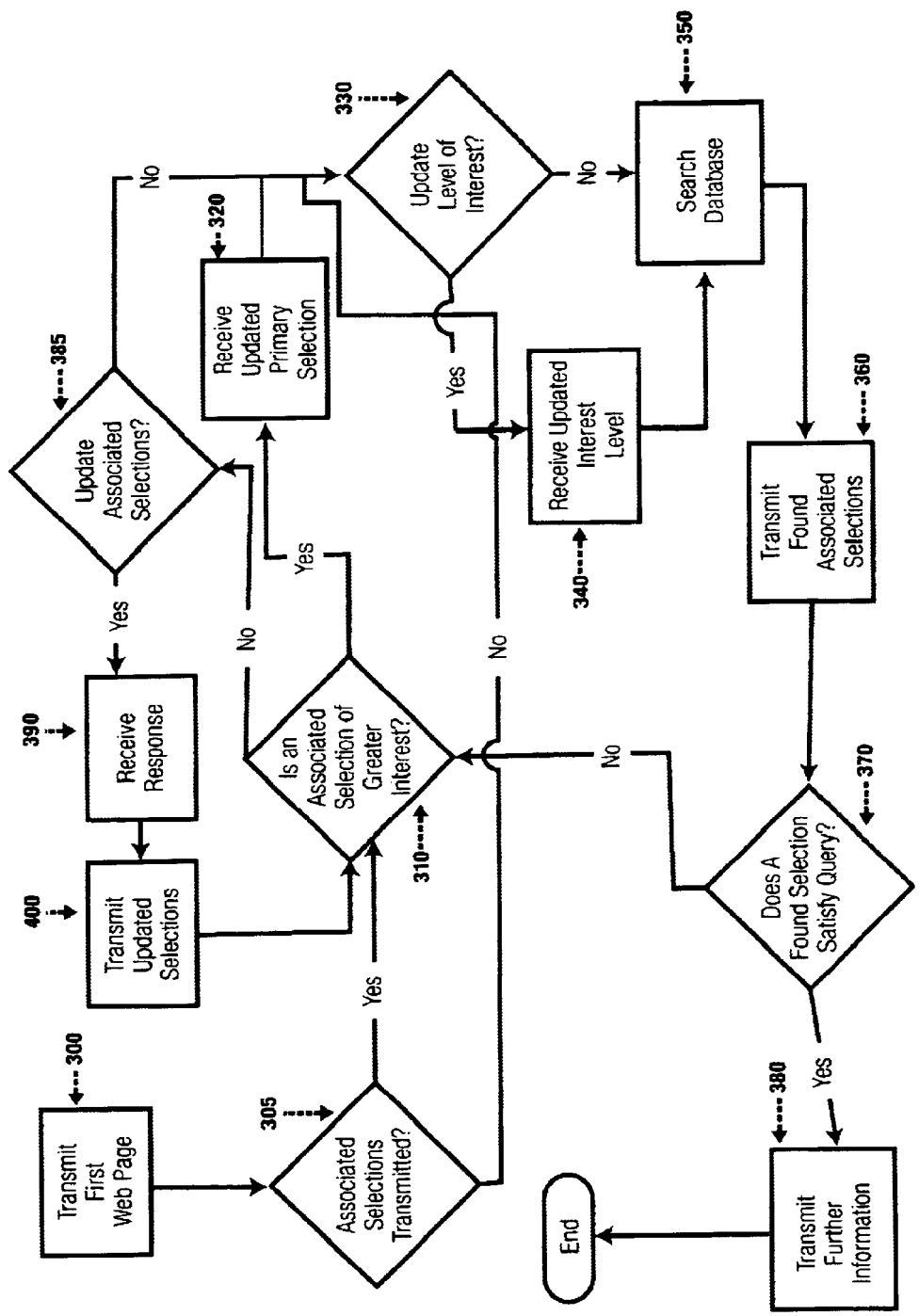
FIG. 4 is a flow chart illustrating the method of the present invention.

FIG. 4 shows a flow chart depicting an embodiment of the method of the present invention. When a user having a query first logs into Web server 15 first Web page 205 is transmitted in step 300 from Web server 15 to client computer 11 and displayed on monitor 23. Typically, first Web page 205 comprises primary information selection 210, level of interest selector 220, and, optionally, a first set of associated information selections 215a–f. Initially, the primary information selection and the association information selections may be selected randomly from the database. Alternatively, the selections 210, 215a–f may be obtained from a subset of the database relating to a particular subject or topic. Preferably, however, the first associated selections are selected to have a range of different association levels with respect to the first primary selection such that the user is presented with selections relating to different types of information. This increases the probability that one of the first associated selections is a terminal selection, i.e., will be relevant to the user's query.

As discussed above, the first associated selections may or may not be transmitted with the first Web page. The user determines in step 305 if the associated selections have been transmitted and proceeds to step 310 if the answer is yes. In step 310, the user determines if one of the associated selections is more of interest to the user than the primary selection. Web server 15 is configured to allow the user to select the more interesting associated selection, if one is present, and replace the primary selection with the selected associated selection. This response is received by Web server 15 in step 320 and the user proceeds to step 330. If the associated selections were not initially transmitted, the user also proceeds to step 330, which is described below.

In step 330, the level of interest selection may be updated using level of interest selector 220 if the user perceives that the new primary selection has a different level of interest to him/her. For example, after replacing the primary selection, updating the level of interest selection is desirable when the updated primary selection is of greater (or lesser) interest to the user than the first primary selection. In step 340 a response to update the level of interest is received by Web server 15. Once the updated level of interest selection has been received or if the user chooses not to update the level of interest selection, the method proceeds to a search step 350.

Search step 350 comprises searching a database for selections corresponding to the level of similarity determined on the basis of the current level of interest selection. For example, according to Table 1, if the user's response indicates that the primary selection is highly interesting to the user, the parent selections are searched for selections having from 65 to 80 percent of attributes in common with the primary selection. On the other hand, if the user's response indicates that the primary selection has a very low interest, the database is searched for selections having from 0 to 20 percent of attributes in common with the primary selection. The set of selections that are found during search step 350 form a set of found associated selections, which may be similar or dissimilar to the primary selection depending upon the current level of interest selection.

Typically, the set of associated selections found during search step 350 comprises a larger number of members than can conveniently be viewed by a user. Therefore, a first subset of the associated selections may be selected from the found associated selections. The first subset of associated selections may be selected randomly from the found associated selections or the first subset of associated selections may be obtained on the basis of the level of association of each member of the first subset with respect to the primary operation. For example, the set of found associated selections may be ranked in ascending or descending order and the first subset selected from the ranked associated selections. The first subset of associated selections are transmitted in step 360 to client computer 11 in the form of a second Web page or by updating the first Web page.

Upon observing the first subset of associated selections the user determines in step 370 if one of the subset of associated selections satisfies the user's query, i.e., represents a terminal selection. If so, the second Web page is configured to allow the user to select the terminal selection. The selection is forwarded to Web server 15. Subsequently, further information regarding the terminal selection may be transmitted step 380 to client computer 11. For example, if the terminal selection relates to a product or service, the user may be offered the opportunity to purchase or rent the product or service. In the event that none of the first subset of associated selections satisfies the user's query, the second Web site is configured to provide the user with several optional responses.

If none of the first subset of associated selections satisfy the user's query at step 370, the user may return to determining step 310. Herein, the user may again elect to replace the current primary selection with one of the associated selections if the user perceives that one of the selections is of a higher interest level than the current primary selection. As before, the user's response to replace the primary selection is collected and forwarded in step 320 to Web server 15 and the method proceeds to step 330 in which the user may elect to update the level of interest selection.

Returning to step 310, a user may determine that the first set of associated selections found in search step 350 does not comprise a selection suitable to replace the primary selection, i.e., none of the associated selections are of greater interest to the user than the current primary selection. In this case, may determine in step 385 to update the associated selections. Therefore, the Web site is configured to receive at step 390 a response from the user to replace or refresh the first subset of associated selections with a second subset of associated selections, as described above. The second subset of associated selections may be drawn from the first set of associated selections in the same manner as the first subset of associated selections and transmitted 400 to client computer 11. Proceeding with step 310 as before, the user evaluates the second subset of associated selections. The process is preferably continued until a suitable terminal selection is found.

The present invention is not to be limited in scope by the specific embodiments and/or examples described herein, which are intended as single illustrations of individual aspects of the invention, and functionally equivalent methods and components are within the scope of the invention. Indeed, various modifications of the invention, in addition to those shown and described herein will become apparent to those skilled in the art from the foregoing description and accompanying drawings. Such modifications are intended to fall within the scope of the present invention.

What is claimed is:

1. A client-server compliant computer system for delivering information to a client computer, the client-server compliant computer system comprising:

at least one server configured to transmit a primary selection to the user; receive a level of interest in the primary selection from a plurality of levels of interest in the primary selection from the user; determine a set of associated selections having a level of similarity, from three or more levels of similarity, including at least the set consisting of "closely related," "moderately related," and "loosely related," to the primary selection determined on the basis of the level of interest in the primary selection; and transmit at least one associated selection from the set of associated selections to the user.

2. The system of claim 1 wherein the server computer is configured to search a database to obtain the set of associated selections.

3. The system of claim 1 wherein each selection in the set consisting of the primary selection and the set of associated selections is characterized by a plurality of attributes useful in determining the level of similarity from an absolute or relative number of attributes common to a member of the set of associated selections and the primary selection.

4. The system of claim 1 further comprising software to receive a new primary selection from the user and replace the primary selection with the new primary selection.

5. The system of claim 4, wherein the server is further configured to:

receive a new level of interest from the user followed by replacing the level of interest with the new level of interest; search a database to obtain a new set of associated selections having a level of similarity to the new primary selection determined on the basis of the level of interest; and transmit the new set of associated information selections to the user.

6. A method for searching and providing information to a user, the method comprising the steps of:

transmitting at least one primary selection to the user;

receiving a level of interest relative to the at least one primary selection from a plurality of levels of interest from the user;

providing three or more levels of similarity to the user.

finding a set of associated selections having a level of similarity, determined on the basis of the level of interest, to the at least one primary selection; and transmitting at least a subset of the set of associated selections to the user; and providing three or more levels of similarity to the user including at least the set consisting of "closely related." "moderately related," and "loosely related."

7. The method of claim 6 further comprising the step of providing at least one button labeled "update" in a graphical user interface presented to the user whereby enabling the user to send the level of interest in at least one data packet.

8. The method of claim 6 further comprising the step of generating a data packet wherein furthermore the step of receiving includes processing at least one data packet to receive a computer executable instruction for determining the level of interest in the at least one primary selection.

9. The method of claim 6 wherein furthermore, the at least one primary selection is not a response to receiving a specific search term.

10. The method of claim 6 wherein the finding step comprises searching a database to obtain the set of associated information selections.

11. The method of claim 6 wherein the level of similarity indicates one of at least three different levels, and a different set of associated selections is obtained depending on which level is determined.

12. The method of claim 6 wherein the primary selection and each member of the set of associated selections are characterized by a plurality of attributes and the level of similarity is determined from an absolute or relative number of attributes common to a member of the set of associated selections and the primary selection.

13. The method of claim 12, wherein the attributes comprise at least one of a word, a phrase, and a keyword.

14. The method of claim 6 wherein the primary selection and at least one of the associated selections relate to a member of the set consisting of a document comprising information, an object for sale, an object for rent, and a service.

15. The method of claim 14 wherein the document is a member of the set consisting of HTML (hypertext markup language, DHTML (dynamic hypertext markup language), x-text, or x-HTML (extensible markup language).

16. The method of claim 14 wherein the object for sale is a member of the set consisting of computer software, a compact disc, a video, a book, an article of food, an automobile, a source of audio provided over the Internet, a source of video provided over the Internet, and an article of clothing.

17. The method of claim 14 wherein the object for rent is a member of the set consisting of a compact disc, a video, a book, or an automobile.

18. The method of claim 6 further comprising the step of replacing the primary selection with a new primary selection selected from the set of associated selections by the user.

19. The method of claim 18 further comprising:

receiving a new level of interest from the user and replacing the level of interest with the new level of interest;

searching a database to obtain a new set of associated selections having a level of similarity to the new primary selection determined on the basis of the level of interest; and transmitting the new set of associated selections to the user.

20. A graphical user interface for a search engine for providing information to a user without requiring input of specific search terms by the user, the graphical user interface comprising: at least one graphic related to a primary information selection; at least one item that can be selected by clicking with a pointer actuated by an input device; and a level of similarity selector having three or more of similarity level buttons or settings including a least the set consisting of "closely related," "moderately related." and "loosely related" that can be selected by the user.

21. The graphical user interface of claim 20 further comprising at least one web page.

22. The graphical user interface of claim 21 further comprising at least one frame.

23. A method for generating customer orders for items following a search, the method comprising the steps of:

including at least one primary selection on a web page in a graphical user interface;

depicting at least one associate selection on the web page;

providing a level of interest selector having three or more of interest level buttons that can be selected by a customer on the web page to indicate a particular level of interest;

generating at least one new primary selection based on a level of interest selected by the customer;

generating at least one new associate selection related to the new primary selection by a level of similarity, from three or more levels of similarity including at least the set consisting of "closely related" "moderately related." and "loosely related." determined from the level of interest selected by the customer, and accepting, in response to an action by the user, an order for an item corresponding to a selection from the set consisting of the at least one primary selection, at least one associate selection, the at least one new primary selection, and the at least one new associate selection.

24. The method of claim 23 further comprising the step of presenting a plurality of selections in graphical user interface for navigation via successive specification of at least a first and second level of similarity by the customer.

25. A computer readable medium having processor executable instructions for carrying out steps in a method for generating customer orders for items following a search, the steps in the method comprising:

providing at least one default primary selection on a web page;

providing at least one associate selection on the web page;

providing a level of similarity selector having a plurality of similarity level buttons including at least the set consisting of "closely related" "moderately related." and "loosely related." that can be selected by a customer;

generating at least one new primary selection based on a level of similarity selected by the customer;

generating at least one new associate selection related to the new primary selection; and accepting, in response to an action by the user, an order for an item corresponding to a selection from the set consisting of the at least one default primary selection, at least one associate selection, the at least one new primary selection, and the at least one new associate selection.

26. The computer readable media of claim 25 having computer executable instructions for carrying out the step of presenting a plurality of selections in graphical user interface for navigation via successive specification of at least one level of interest from a plurality of levels of interest in a displayed primary selection by the customer.

* * * * *